US005852718A

United States Patent [19]
Van Loo

[11] Patent Number: 5,852,718
[45] Date of Patent: *Dec. 22, 1998

[54] METHOD AND APPARATUS FOR HYBRID PACKET-SWITCHED AND CIRCUIT-SWITCHED FLOW CONTROL IN A COMPUTER SYSTEM

[75] Inventor: William C. Van Loo, Palo Alto, Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 498,950

[22] Filed: Jul. 6, 1995

[51] Int. Cl.$^6$ ................................................. G06F 12/00
[52] U.S. Cl. .............................. 395/200.38; 395/200.41
[58] Field of Search ..................... 395/200.02, 200.38, 395/200.41, 200.6; 370/902, 904, 353, 352

[56] References Cited

U.S. PATENT DOCUMENTS

| | | | |
|---|---|---|---|
| 4,592,048 | 5/1986 | Beckner | 370/60 |
| 4,882,674 | 11/1989 | Quint | 395/684 |
| 4,926,416 | 5/1990 | Weik | 370/60.1 |

(List continued on next page.)

OTHER PUBLICATIONS

IBM Technical Disclosure Bulletin, "Algorithm for Voice and Data Transmission in Hybrid Switches", vol. 31, No. 12, May 1, 1989, pp. 435–436.

J.S. Meditch, et al., "An Integrated Services Fast Packet/Fast Circuit Switch", World Prosperity Through Communications, IEEE International Conference on Communications, vol. 1, pp. 104–110, Jun. 11, 1989.

Tamura Kazuhiro, "Communication System", Patent Abstracts of Japan, vol. 17, Aug. 20, 1993 (Pat: A 5102971).

D. Greenley, et al., "UltraSPARC (TM): The Next Generation Superscalar 64–bit SPARC", IEEE, pp. 442–451, Mar. 5, 1995. (An article published by Applicant relating to Applicant's new architecture, to which the present invention also relates).

*Primary Examiner*—Eric Coleman
*Attorney, Agent, or Firm*—Conley, Rose & Tayon, PC; B. Noel Kivlin

[57] ABSTRACT

A dynamically reconfigurable hybrid computer system is provided that executes transaction requests in one of two ways—either as packet-switched transactions or as circuit-switched transactions. Each transaction request is inspected as it is issued by a master device in the system, and it is determined in each case whether the transaction should be executed as a packet-switched transaction or as a circuit-switched transaction. Preferably, all slave read requests in a uniprocessor system are executed as circuit-switched transactions, such that a system controller coupled between the master device and the slave device, upon receipt of the request, immediately schedules the datapath between the master and slave devices and suspends other, competing transactions to execute the data transfer. The states of other transactions are stored, and are restored upon completion of the circuit-switched transaction. Criteria for determining whether a given transaction request should be treated as circuit-switched include: the type of transaction requests (e.g. all slave read requests may be treated as circuit-switched); whether the system includes only one or alternatively multiple processors (e.g., all slave read requests in a uniprocessor system may be treated as circuit-switched while those in a multiprocessor system may be treated as packet-switched); the destination address of the slave device for which the transaction request is intended (e.g. read requests to fast devices such as PCI devices may be treated as circuit-switched); and the identity of the master issuing the request. The system is dynamically reconfigurable, by specifying different criteria in software and/or by automatically determining, upon insertion or removal (or malfunctioning) of a processor, that the system should operate in a uniprocessor mode or a multiprocessor mode, where the criteria are at least in part different in the two modes.

23 Claims, 10 Drawing Sheets

U.S. PATENT DOCUMENTS

| | | | |
|---|---|---|---|
| 4,996,685 | 2/1991 | Farese | 370/58.1 |
| 5,014,266 | 5/1991 | Bales | 370/60.1 |
| 5,208,806 | 5/1993 | Hasegawa | 370/60.1 |
| 5,247,616 | 9/1993 | Berggren | 395/200.42 |
| 5,349,673 | 9/1994 | Yasuda | 395/200.41 |
| 5,598,411 | 1/1997 | Matsukawa | 370/352 |
| 5,742,761 | 4/1998 | Olnowich | 395/200.2 |

METHOD AND APPARATUS FOR HYBRID PACKET-SWITCHED AND CIRCUIT-SWITCHED FLOW CONTROL IN A COMPUTER SYSTEM

BACKGROUND OF THE INVENTION

The present invention relates to a new method and apparatus for flow control in a packet-switched microprocessor-based computer system (uniprocessor), a network of such computer systems, or a multiprocessor system. In particular, it relates to a new flow control design which is a hybrid between circuit-switched and packet-switched systems, and is dynamically or statically variable between the two.

The system of the invention, in its pure packet-switched form, operates in the same manner as that described in applicant's copending United States patent application, "Method and Apparatus for Flow Control in a Packet-Switched Computer System" by Ebrahim et al., Ser. No. 08/414,875 filed Mar. 31, 1995, which is incorporated herein by reference.

Reliable and streamlined flow control of microprocessor transactions (including data and/or instructions) in a computer system is necessary to prevent wasted operations and assist the system to run efficiently. Typical packet-switched bus interfaces in computer systems use negative acknowledgments, or back pressure techniques, for flow control. This requires either the master issuing retried transactions due to negative acknowledgments by slaves, or complex handshake signals to modulate the back pressure as a function of dynamic changes in system resource availability.

Both of these methods are complex to implement and increase the bus latency by spending extra clock cycles performing handshakes, re-arbitrating for the bus, re-scheduling interconnect resources, etc.

Some systems avoid dynamic (negative) feedback (e.g. negative acknowledgments) altogether by making all the receive queues of a large enough size, so that they can contain the maximum number of transactions that can foreseeably be received by them. This has the disadvantage that is makes the slaves more expensive and inherently non-scalable, especially when there are several sources of requests with each making multiple requests. This approach can also aggravate the system latency, on account of the very deep receive queues.

As the rate of processor speed improvements continue to exceed that of memory speed improvements, reducing interconnect latencies becomes ever more important to achieving substantial gains in performance. It would be especially useful to arrive at a system that avoids the use of negative feedback, to avoid the inefficiencies associated with that approach, without paying in complexity, size and hardware costs by inflating the sizes of the transaction receive queues.

Various flow control techniques for packet-switched systems have been created, such as for telecommunication switch designs and data communication protocols. Most extant designs use some form of dynamic feedback signal to throttle the sender, on either (1) a link-by-link basis where each downstream node sends a feedback signal to the upstream node, or (2) an end-to-end basis, where only the two end points of the communication participate in flow control, and the presence or absence of feedback from the destination is used by the sender to control its flow. Another method that has been proposed is rate-based flow control, where the sender meters its rate of send at an agreed-upon rate, and modulates it based on dynamic feedback signals sent to it by any point downstream. Most packet-switched computer systems use link-by-link flow control protocol.

In link-by-link flow control, the downstream recipient asserts a feedback signal to the upstream sender, indicating a buffer-full or congestion condition at the recipient. The feedback signal can take one of several forms:

(a) a pulse signal causing the sender to back off for some time and retry again;

(b) a level signal causing the sender to not send, while the signal remains asserted; or (c) a stop-start two-message feedback from the destination to throttle and restart the sender respectively. (Most existing packet-switched system buses use this method.)

Link-by-link flow control may also operate through credits issued by the downstream recipient to the upstream sender, where the sender only sends as many requests as the credits allow, and then stops until new credits are issued to it by the downstream recipient. The downstream recipient dynamically modulates the number and frequency of credits issued to the upstream sender, based on the recipient's receive queue capacity as well as any other congestion conditions detected by the recipient. For a description of such a system, see *The FCVC Proposal for ATM Networks*, Proc. 1993 International Conf. on Network Protocols, pp. 116–127, by H. T. Kung et. al.

Link-by-link flow control can also be accomplished by making the downstream queue large enough to accommodate the maximum number or items it is contemplated ever to have to receive. Hence there is no loss of items (requests), and no need to throttle the upstream sender. This is an expensive, nonscalable solution.

End-to-end flow control via absence or presence of feedback from the destination to the source is implemented in the TCP sliding window protocol for flow control and congestion management, as well as in BECN/FECN proposal for congestion control in ATM networks.

One approach to flow control is to use a master device to keep track of the number of transactions that it can issue with a predefined agreement of queue depths at its interface to the interconnect, and the interconnect issuing an ACK (acknowledgment) for each completed transactions as a means of flow control. In protocols that have used this approach (HDLC and SDLC), the sender has no information about the capabilities (notably, queue size) of the final recipient of the packet. In addition, such protocols require that the queue depths be determined in advance, and hence are not scalable. Also, this approach does not lend itself well to a multiprocessing environment, since each processor (or master) would have to keep track of all the transactions of all the other processors (or masters).

In a credits-based scheme, credits are issued by a downstream recipient to allow new packets to be sent. Such a scheme has the disadvantages that: (1) credits are issued as frequent and unsolicited feedback packets from one switch to another; and (2) credits are modulated based on dynamic congestion conditions.

Thus, a new apparatus and method are needed, which accommodate uniprocessor, multiprocessor and networked environments and provide for efficient, scalable and cost-effective packet-switched transaction flow control.

A problem, however, with packet-switched flow control is that there can be overhead, i.e. clock cycles utilized, in the negotiation for the availability of masters, slaves and the datapath for the completion of transactions. In addition, in certain settings, such as a uniprocessor system, certain transactions may not require—or for certain transactions it may not be desirable to use—a packet-switched protocol. For instance, in a uniprocessor system it may be desirable that all slave read requests should be conducted as circuit-switched requests.

In a multiprocessor system, fast master devices may effectively be penalized by the use of a packet-switched system, and it may thus be desirable to accelerate their slave read procedures, e.g. where a graphics data is requested from a fast graphics device.

It would be advantageous to provide a system wherein faster devices in a multimaster system are given a priority procedure for given requests, particularly for slave read requests.

SUMMARY OF THE INVENTION

The present invention employs a method and apparatus for centralizing the flow control decisions in a new system controller, which acts in conjunction with input and output queues of the masters and slaves in the system. The system controller determines the total queue sizes of all the queues in the system at initialization time, and permits a master (e.g. a processor) to send a number of transaction requests only to the extent of that total. The system of the invention classifies system interconnect queues as request queues, read-data queues, and write-data queues, and determines rules of transfer of both requests and data as loosely coupled events. An interconnect (system) controller is connected between one or more masters (e.g. microprocessors) and the slave devices, which may be I/O units, disk drives, memory, etc. The interconnect controller includes a queue for each master, and each master includes a transaction counter indicating the number of outstanding transaction requests from that master to the controller. The interconnect controller additionally includes both request and write data queues for each downstream slave, and a transaction counter indicating the number of outstanding requests from the controller to that slave and the outstanding write data transfers from some master to that slave.

The masters and the controller are prevented from issuing any transaction requests (or to initiate a write-data transfer requests) downstream when the respective counter indicates that the corresponding request or data queue downstream is full. When a transaction is complete (e.g. upon the receipt of requested data read or consumption of write data by the slave), the relevant counter is decremented to indicate the availability of a place in the transaction queue or write-data queue.

Queue overflow and congestion conditions are thus avoided by prohibiting the master or system controller from sending more transactions or data than the recipient has space for. A hardware handshake is used both to signal completion of a data transfer and to notify the master of one more available space in the downstream queue. The handshake is thus not an unsolicited signal, as in a credits-based scheme, and the signals are not based upon dynamic congestion.

The maximum queue sizes in the system are determined at initialization, and thus are known before execution of any applications by the master(s). The masters and controller thus have at all times information on the number of available spots in the queue immediately downstream—to be contrasted with a credits-based scheme, where the maximum queue sizes are not known a priori, and the sender can only keep track of the credits issued to it. The initialization sequence is software-driven (e.g. by a boot PROM), and the queue sizes and depths are determined by this sequence, which provides adaptability of the system to reconfigure it for different slaves (having different queue sizes) or to configure out nonfunctioning queue elements.

The elimination of (advance or overflow) feedback signals in the present flow control system reduces the interface latency, since there is no extra handshake, no rescheduling or rearbitrating for resources, and no retries by the master. Hence a simpler design is usable, which is easily scalable according to the number of processors, and the slave queues can be downsized as desired for price/performance considerations and desired bandwidth, without fear of losing any transactions due to smaller queue sizes. Furthermore, a variety of systems ranging from small/inexpensive to large/expensive can be designed from the same modular CPU and I/O interfaces by simply down- or up-scaling (sizing) the respective queues and buffers in the interconnect, as desired. Since the interconnect controller is custom-designed to accommodate a given set of masters and slaves with a given range of queue sizes, the masters and slaves needn't be redesigned at all. Because the system controller is relatively inexpensive, a number of different controller designs can be utilized without appreciably raising the cost of the system—which would not be the case if the processors and slave devices needed modification.

The overall system design and effort required to test and validate correct system behavior under saturation conditions (when flow control is important) is also greatly simplified.

The above-described packet-switched mechanism is combined with additional features resulting in a dynamically configurable packet-switched and circuit-switched system. All slave read requests may be designated as circuit-switched requests, so that data transfers take place quickly and efficiently, without the need for the slave to respond with ready signals.

When one or more processors or other master devices are added to the uniprocessor system, this is detected by each system controller. Certain master devices may be predesignated such that the corresponding system controllers respond to slave read requests therefrom as circuit-switched requests. These requests are processed out of turn, in advance of other transactions, to improve the overall performance of the system.

DESCRIPTION OF THE PREFERRED EMBODIMENTS

I. The Pure Packet-Switched Embodiment of the Flow Control System

The description of the invention in this Section I is of the purely packet-switched embodiment of the present invention. The packet-switched embodiment is the subject matter of the parent of the present application, and the description in Section II below of the hybrid embodiment relies upon it.

Figure 1:
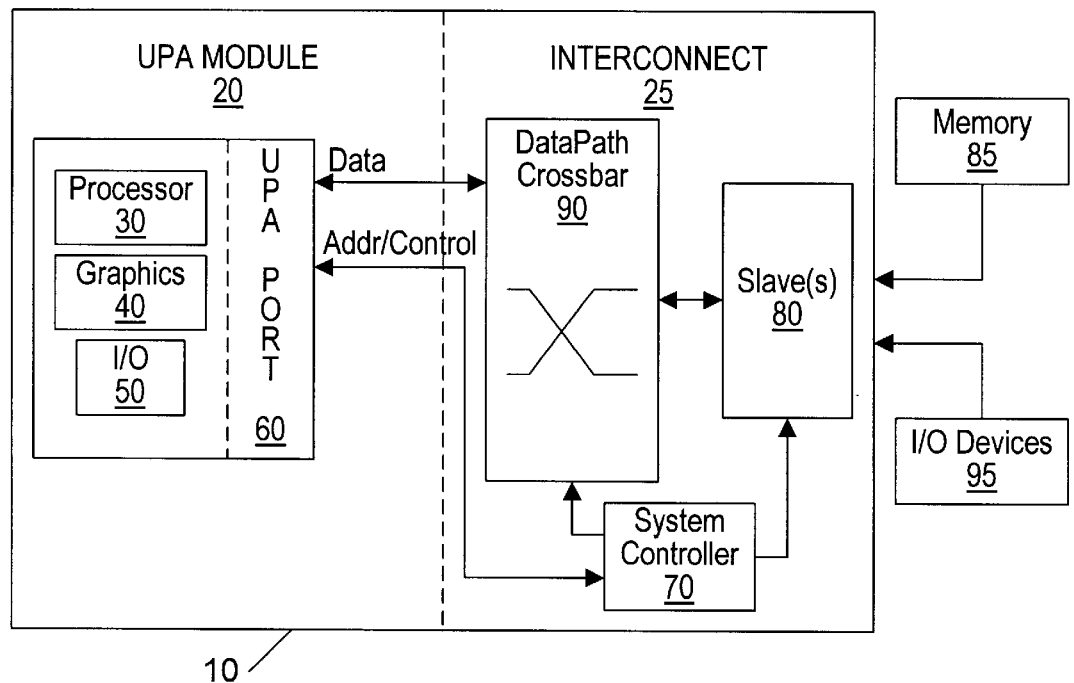
FIG. 1 is a block diagram of a preferred embodiment of a computer system incorporating the present invention.

FIG. 1 is a top-level block diagram of a computer system 10 incorporating the present invention. This diagram relates to a specific implementation of applicant's new Ultrasparc Architecture, which is described fully in the document *UPA Interconnect Architecture,* by Bill van Loo, Satya Nishtala and Zahir Ebrahim. Sun Microsystems, Inc.'s internal release version 1.1 of the UPA Interconnect Architecture has been submitted as Appendix A to a related patent application by applicant, entitled "Packet-Switched Cache-Coherent Multiprocessor System", Ser. No. 08/415,175, by Ebrahim et al. That patent application, filed in the United States Patent Office on Mar. 31, 1995, describes many of the broader features of the UPA architecture, and is incorporated herein by reference.

The present invention uses a new system interconnect architecture and concomitant new methods for utilizing the interconnect to control transaction requests and data flow between master devices and slave or memory devices.

In FIG. 1, the system 10 includes a UPA module 20 and an interconnect network or module 25, which in different embodiments of the invention may or may not be connected to the data path. The UPA module may include such devices as a processor 30, a graphics unit 40, and an I/O unit 50. Other units may be included, and act as the master units for the purposes of the present invention. A master interface is defined as the interface for any entity initiating transaction requests; examples of such masters are a CPU making memory requests, or an 1/0 channel and bridges making DMA requests.

In general, in this application a master is exemplified by a processor. However, a master may be any transaction-requesting device, whether or not it includes a microprocessor. Similarly, a "slave" refers herein to any device that can accept a transaction request, including both memory and non-memory devices, etc., and including devices such as processors and I/O controllers that may themselves act as masters.

For the purposes of this invention, a "transaction" may be defined as a request packet issued by a master, followed by an acknowledgment packet (not necessarily a full packet, depending upon the chosen implementation) from the recipient immediately downstream. There may or may not be a data transfer accompanying a request packet, and the data transfer may either occur on the same set of wires as the request packet, or on separate datapath wires. This is described in greater detail below in connection with FIGS. 4–7.

A UPA port 60 couples the module 20 to a system interconnect controller (SC) 70, which is in turn coupled to one or more slave interface(s) 80. The slave interface may be an interface for memory (such as main memory), an I/O interface, a graphics frame buffer, one or more bridges to other interconnection networks, or even a CPU receiving transactions to be serviced. In general, any device that accepts transaction requests for servicing may be given a slave interface 80 in accordance with the invention, such as conventional memory device(s) 85 and/or standard I/O device(s) 95.

In a preferred embodiment, the system controller 70 and UPA interface 60 are carried on the main processor chip, and the slave interface is on the motherboard, though many variations are possible. More generally, each master (whether a processor or some other device) has a UPA master interface, and each slave includes a UPA slave interface. The system controller in each case resides with the system.

A datapath crossbar 90 is also included in the interconnect module 25, and is coupled to the slave interface(s), the system controller 70, and the ports 60. The datapath crossbar may be s simple bus or may be a more complicated crossbar. (The UPA ports 60 may be configured as part of either the UPA module 20 or the interconnect module 25.) The datapath unit 90 is used to transmit read and write data in a manner to be described below.

One or more conventional memories or other data storage devices 85 and one or more input/output (I/O) devices 95 forming part of the system 10 are provided for user interface, data output, etc.; these various slave devices may include RAM, ROM, disk drives, monitors, keyboards, track balls, printers, etc. They are coupled into the interconnect module 25 via the slave interfaces 80. The "slave" designation means in this case only that such devices accept requests from one or more processors and fulfill those requests.

The interconnection network may in general take the form of a number of different standard communication topologies that interconnect masters and slaves, such as a point-to-point link, a single bus or multiple buses, or switching fabrics. The interconnect may employ any of a number of conventional mechanisms for switching the transaction request to a slave using one or more signal paths, and the switching may be based either on the addressing information contained in the transaction request packet, or on another protocol not necessarily dependent on the contents of the request packet. There may be any amount of buffering, or no buffering, in the interconnect.

The preferred embodiment(s) of the invention shown in FIG. 1 (and FIG. 1A; see discussion below) has a centralized controller that connects to all masters and all slaves, and consequently has complete visibility to system request and data traffic. An alternative embodiment involves the use of distributed controllers, in which case it is desirable to maintain visibility, and in certain designs a maximum-capacity queue size may be needed.

Figure 1A:
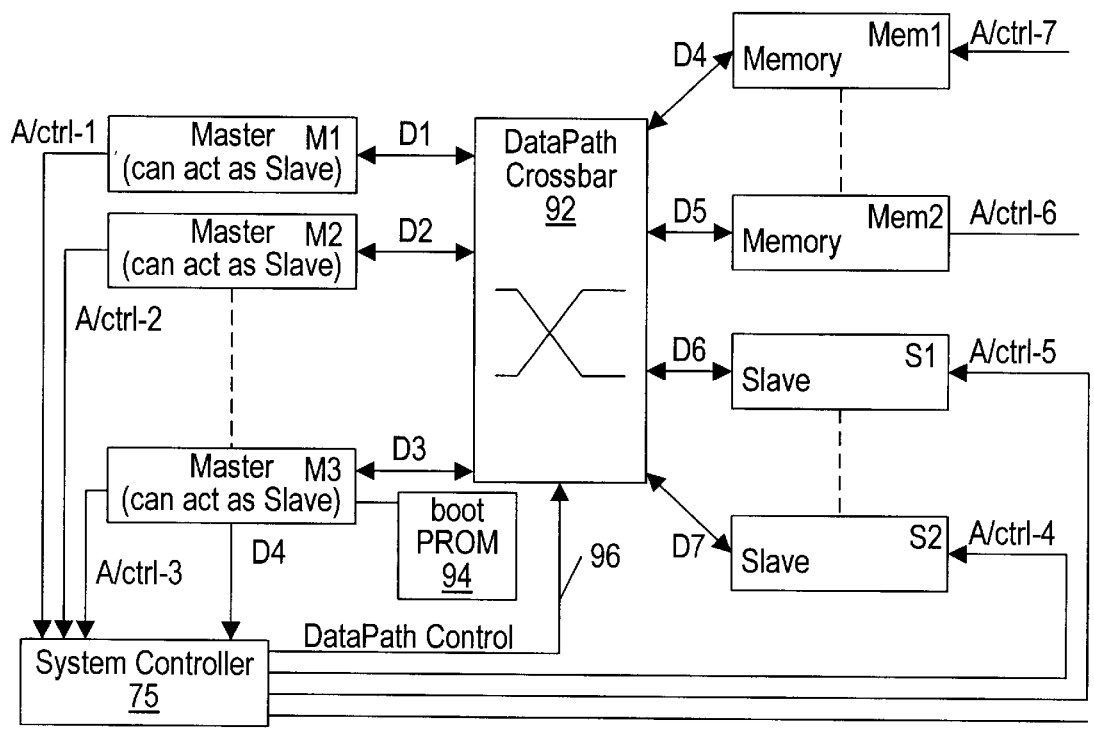
FIG. 1A is a block diagram of a more generalized embodiment of the a computer system incorporating the invention.

FIG. 1A shows a more generalized block diagram of a system according to the invention. Here, there are multiple masters (three exemplary masters M1–M3 being shown). These masters may act in certain circumstances as slaves. For instance, if M1 is a processor and M3 is an I/O controller, then M3 will often act as a slave to M1, as in the initialization procedure described below. On the other hand, during a DMA (direct memory access) operation, the I/O controller M3 will act as a master to a memory device, such as any of one to many of memories represented as M1 . . . M2 in FIG. 1A.

Slave devices S1 . . . S2 (which may be one, several or many slave devices) are also provided, and the masters, memories and slaves are coupled via a system controller 75 in the same fashion as the system controller 70 is coupled to the master and slave(s) in FIG. 1. The SC 75 is coupled via a datapath control bus 77 to a datapath crossbar (or interconnect) 92, as with the datapath crossbar 90 in FIG. 1. The control bus 77 will typically be much narrower than the system or data buses; e.g. in a preferred embodiment of applicant's system, the datapath is 72 or 144 bits wide, while the SC datapath control bus may be only 8 bits wide.

As indicated above, the SC 75 has complete visibility to all masters, slaves, and memory. The system controller need not be on the datapath, but should have control over and visibility to the datapath.

The SC, masters, memories and slaves in FIG. 1A are interconnected by address/control (A/ctrl) lines as shown, which may be unique (dedicated, point-to-point links) address/control lines or may be bussed together. Data may also be bussed or switch-connected. Address/control and data lines/buses may share the same links, such as by providing shared address/data buses.

A boot PROM 94 is connected by a bus to the I/O controller M3, which reads it upon start-up to initialize the system in a conventional manner (e.g. to initialize the CPU, registers, etc.), and in addition to initialize the queues, registers and counters of the present invention. The initialization procedure is described in detail below relative to FIG. 4.

Figure 2:
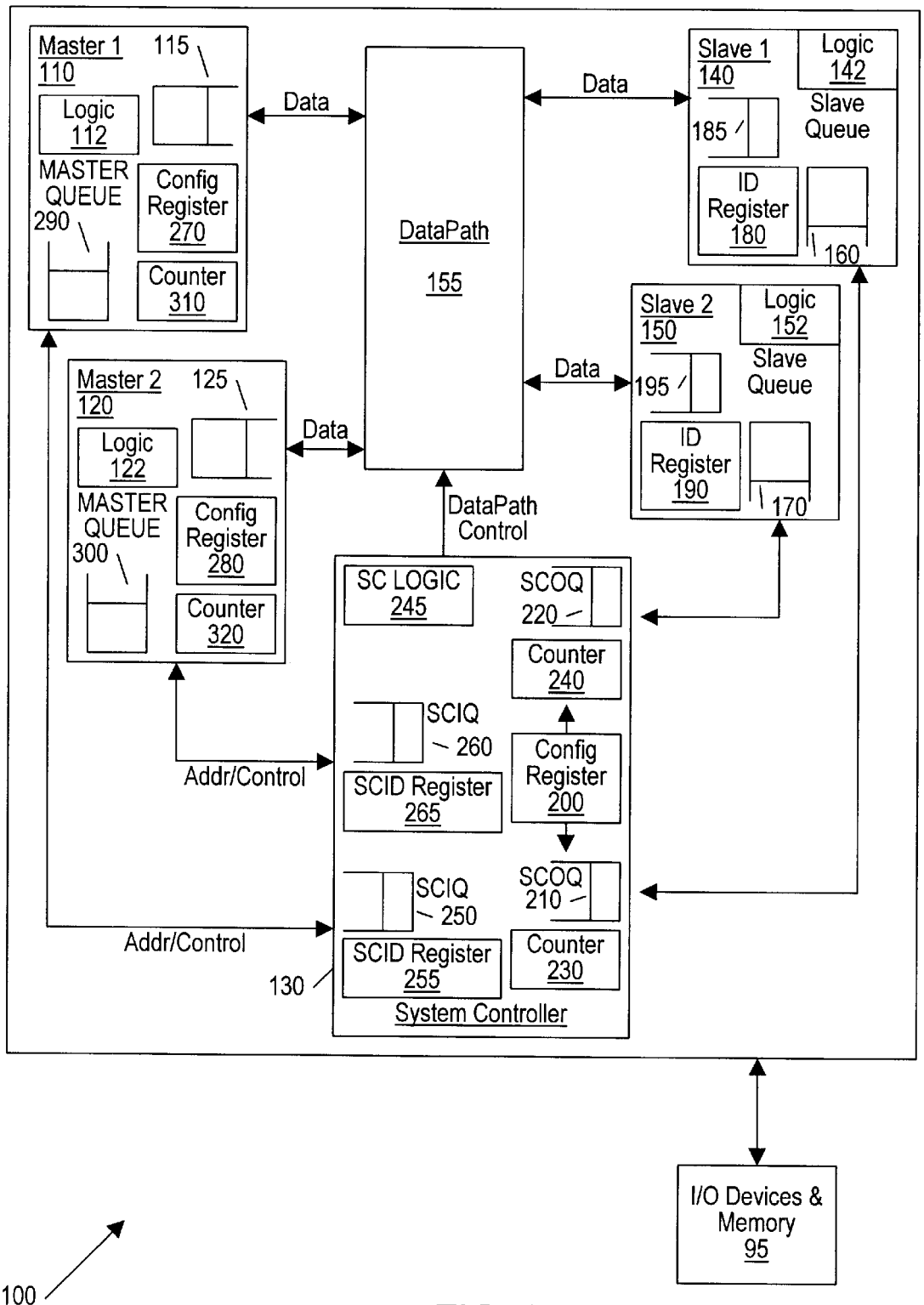
FIG. 2 is a more detailed diagram of a portion of the system shown in FIG. 1.

FIG. 2 illustrates an interconnect module 100 in a specific implementation where two master interfaces (or "masters") 110 and 120, a single system controller (SC) 130, two slaves interfaces (or "slaves") 140 and 150, and a datapath crossbar 155 are used. There may in principle any number of masters and slaves. The masters may be any of the interfaces discussed above, or in general any devices or entities capable of issuing transaction requests.

Each slave 140 and 150 includes a slave queue (160 and 170, respectively) for receiving transaction requests. The maximum sizes of these slave queues are represented by values in port ID registers 180 and 190, respectively.

Masters 110 and 120 include data queues or buffers 115 and 125, and slaves 140 and 150 include data queues or buffers 185 and 195, whose functions are described in detail relative to FIGS. 6 and 7 below. The maximum sizes of the slave write data queues 185 and 195 are also represented by values in port ID registers 180 and 190, respectively. In the special case where there is a one-to-one correspondence to a request queue entry (e.g. 100) and a data buffer in the write data queue (e.g. 185), with the write data queue being maximally dimensioned to hold an entire packet (i.e. dimensioned such that it can hold the largest contemplated packet size), then the queue size in 180 can be represented by a single number.

In FIG. 2 the slaves 140 and 150 may be any of the slave devices described above with respect to slave 80 in FIG. 1, and in particular slaves 140 and 150 may represent any number of memory or non-memory slave devices.

Initialization Operation

The basic steps that take place at initialization include:

(1) determine the sizes of the respective receive queues of all the slaves coupled to the system;

(2) store the sizes of the slave receive queues in registers within the system controller;

(3) determine the sizes of the system controller's receive queues; and (4) store the sizes of the system controller receive queues in predetermined registers in the master(s).

Thus, at system initialization, the initialization software reads the contents of the size fields for the request queue and write data queue in each slave, and then copies these values into corresponding fields inside the configuration (config) register 200 of the SC 130. In one embodiment, the values in ID registers 170 and 180 (representing the slave queue sizes) are stored in separate fields in configuration ("config") register 200 of the SC 130. In addition, the values of the SCID registers 255 and 265 (representing the SC queue sizes) are stored in config registers 270 and 280, respectively, of the master interfaces 110 and 120.

Alternatively, config register 200 may be replaced by a separate configuration register for each UPA port implemented in the given SC. In this case, there would be two separate config registers, one for each of slaves 140 and 150.

The masters 110 and 120 also include transaction request output queues 290 and 300, respectively, which are used to queue up transaction requests from each of the master interfaces to the SC 130. Each master 110 and 120 has a counter (310 and 320) used to track the number of pending transaction requests, as described below.

The SC 130 is provided with output queues 210 and 220 and associated counters 230 and 240, respectively, whose operation will be described below.

The SC 130 also includes an SC instruction (or transaction request) queue (SCIQ) for each master, so in this case there are two SCIQ's 250 and 260. Associated with each SCIQ is an SCID register, namely registers 255 and 265, respectively, containing a value representing the maximum size of the associated SCIQ.

The circuitry for carrying out the operations of the SC is indicated by SC logic module 245 in FIG. 2, and may include conventional hardwired and/or software logic for carrying out the necessary functions. For instance, an ASIC may be provided for carrying out the transaction request handling, queue control, numerical comparisons and counting, etc. that are used in the invention. Alternatively, a general purpose processor could be used, configured (such as by program instructions stored in an associated conventional memory, e.g. ROM or RAM) to execute the functions discussed herein.

Many combinations of standard hardware and software are possible to execute these functions in the system controller; and the same is true of the functions carried out in the slave devices (see slave logic modules 142 and 152) and the master devices (see master logic modules 112 and 122). Here, the logic modules represent all of the circuitry, programming, memory and intelligence necessary to carry out the functions of the invention as described; assembling the hardware and software to do so is a matter of routine to one skilled in the art, given the teaching of this invention. (Where a master device is a processor, the logic for implementing the present invention can of course be made up in large part of the processor itself and the instructions it executes.) The particular implementation of these logic modules, and the extent to which it is represented by software or hardware, are widely variable and thus shown only in block form in FIG. 2.

The initialization sequence will now be described with reference to FIGS. 1A and 2 (for the architecture) and FIGS. 6–7 (for the flow control of the initialization sequence). The instructions for the initialization sequence are stored in nonvolatile memory, in this embodiment in the boot PROM 94. The processor M1 has a fixed address to the boot PROM 94, and accesses it by a read request over address/control line A/ctrl-1 to the SC 75. The SC sends the request via the datapath control line or bus 96 (which may be an 8-bit bus) to the datapath crossbar 92, which in turn accesses the I/O controller M3. The I/O controller thus acts as a slave to the processor M1 in this operation.

(It should be noted throughout the present description that for the sake of clarity split address and data buses are assumed and illustrated; however, the present invention is equally applicable to systems using shared address/data buses.)

The I/O controller M3 accesses the boot PROM 94 to read the code for the initialization sequence, and sends it via line A/ctrl-3 to the SC 75, which sends it on to the processor M1.

In FIG. 1A, the SC 75, masters M1–M3, slaves S1–S2 and memories Mem1–Mem2 include the config registers, counters, SCID registers, ID registers, master queues, SCIQ's, and slave queues as depicted in FIG. 2; however, for the sake of clarity these elements are not shown in FIG. 1A.

Once the processor M3 has retrieved the initialization sequence instructions from the boot PROM 94, they are executed. The first operation is to read the ID registers of the memories and slaves. These ID registers, as described above with respect to FIG. 2, contain the values of the respective slaves' instruction queues and write data queues. The flow control sequence that is followed for this read operation follows that described below for the Slave Read Flow Control in FIG. 6, the data from the ID registers being retrieved via a data bus (or datapath) 715.

The ID register values are written to the config registers (such as config register 200) of the system controller (75 in FIG. 1A, 130 in FIG. 2). As discussed above, there is one config register per slave, or at least one field in a config register for each slave. The flow sequence followed for this write operation is as discussed below relative to FIG. 7. The I/O controller for the system is used for this purpose. Thus, assuming in FIG. 7 that for this operation the slave 710 is the I/O controller, the master (in this case, a processor) 700 causes the SC 720 to write the ID register values from each slave to its own config registers. In each case, the respective ID register value is stored in a buffer of the processor (master 700 in FIG. 7 or master M1 in FIG. 1A), and this value is passed to the system controller to the I/O controller (slave 710 in FIG. 7 or master/slave M3 in FIG. 1A), which then writes it right back to the system controller via the datapath provided for that purpose (data bus 715 in FIG. 7).

Figure 7:
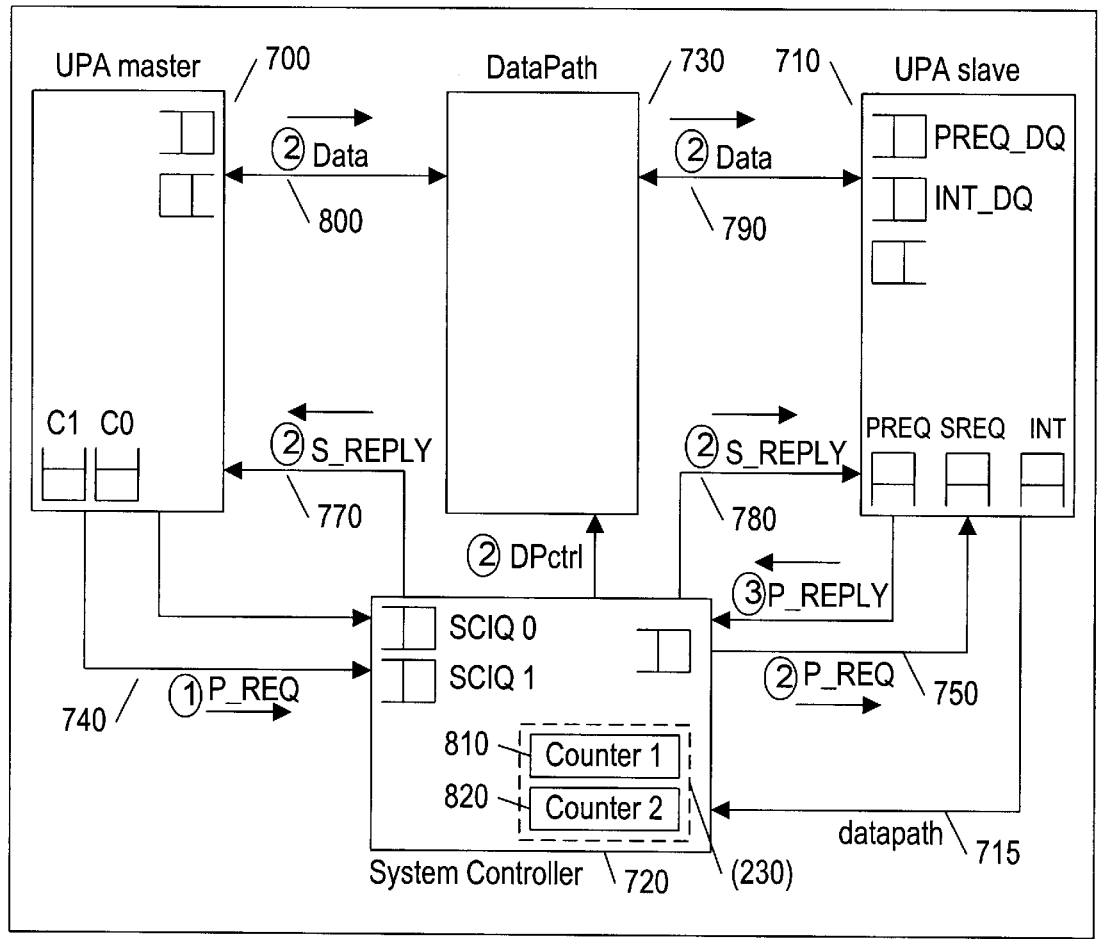

The next step in the initialization procedure is to read the sizes of the receive queues of the system controller (e.g. the SCIQ's 0 and 1 shown in FIG. 7 or SCIQ's 250 and 260 in FIG. 2). The receive queue sizes are stored in the SCID registers (see registers 255 and 265 shown in FIG. 2). This read operation is executed using the I/O controller of the system, resulting in the master/processor storing the SC receive queue values in a buffer or pre-assigned register.

Finally, these SCIQ sizes are written into the master config registers (such as 270 and 280 in FIG. 2). If the system is a uniprocessor system, then this amounts the processor writing the SCID values to its own config register and to the config registers of other devices that can act as masters. If it is a multiprocessor system, then one processor acts as a master and writes SCID values to both its own config register and to those of the other processors.

General Operation of Flow Control

Below is a generalized description of transaction request flow control in the present invention, followed by a more specific description of the preferred embodiment of the invention including details as to the initialization sequence and flow control for specific types of transaction requests.

After initialization of the config register 200 in the SC 130 and the config registers 270 and 280 in the masters, normal operation of the system 100 can commence. During operation, the SC maintains in its config register 200 a copy of the respective values of the slave ID registers 180 and 190, and hence "knows" the maximum number of transaction requests that each slave interface can handle in its slave request queue (160 or 170), and the maximum amount of data that can be held in its slave data queue (185 or 195). At any given time, the counters 230 and 240 store the number of pending transaction requests in the corresponding slave request queue, and the size of the pending store data in the slave store data queue. Unissued transaction requests may in some circumstances be stored for the slaves 140 and 150 in output queues 210 and 220, which may be arbitrarily large, and in particular may be larger than the SCIQ's 250 and 260. In other circumstances, requests remain enqueued in corresponding SCIQ's.

When a master, e.g. master interface 110, has a transaction request to issue, it first compares the value in its counter 310 with the value in the config register 270. If the counter value is less than the config register value, then the request may be issued. The request is sent from the master's output queue 290 to the SCIQ 250, and the counter 310 is incremented by one.

The SC 130 then determines to which of the two slaves 140 and 150 the transaction request is destined, and checks the counter for that queue. For instance, if slave 140 is the destination for the transaction request, then the SC 130 checks the counter 210 and compares the value stored there with the value in the config register 200 corresponding to the ID register 180. If the counter 230 value is less than the value stored in the config register, then the SC 130 issues the transaction request and increments the counter 230. Otherwise, the transaction request is maintained in the output queue 210. (In some transactions related to ordering constraints for transactions for different requests from the same master, it may be desirable to leave the request in the SCIQ 250.)

Assuming the transaction request is issued in this example, then the SC 130 sends a signal to the master 110 to this effect (upon completion of the transaction, e.g. the transfer of data) and removes the transaction request from its input queue 250 (upon sending of the reply). The master 110 accordingly decrements its counter 310, which enables it to issue an additional pending transaction request. If the counter 310 was at its maximum (indicating that the SCIQ 250 was full), the decrementation of the counter 310 allows room for a single additional transaction request from the master 110 to the SC 130. If the counter 310 was not at its maximum value, then the decrementation of the counter 310 simply adds one to the number of transaction requests available to the master interface 110.

The output queues 210 and 220, which may be arbitrarily large in size (and in particular may be much larger, if desired, than SCIQ's 250 and 260 and slave input queues 160 and 170) are preferable but not necessary to the operation of the present invention. If separate output queues are not kept for the two slaves (queue 210 for slave 140 and queue 220 for slave 150), or if ordering constraints for the master prevent the use of both queues 210 and 220, then the transaction requests stored at queues 250 and 260 must wait until the respective destination slaves can accept them before being cleared out of their queues.

Such ordering constraints in the system may be global ordering requirements. That is, in a particular system it may be required that a pending transaction in queue 210 from master 110 (intended for slave 140) be processed before a succeeding transaction from master 110 intended for slave 150 can be processed.

Aside from such an ordering requirement, or assuming the pending transactions in SCIQ's 250 and 260 are from different masters, then either of these queues 250 and 260 can release a request for either slave 140 and 150 via the SC output queues 210 and 220, thereby allowing an increase in throughput. For instance, a slave 140 request in SCIQ 260 can be sent to SC output queue 210 even if slave 140 is full (i.e. its input queue 170 is full), and a succeeding slave 150 request from SCIW 260 can then be sent to slave 150. If the SC output queues were not provided, then the slave 150 request would have to wait for slave 140 to clear before being issued. The SC output queues thus provide truly independent operation of the two slave interfaces.

The SCIQ's 250 and 260 are independent of one another, as are the master interfaces and their respective counters. Thus, the SC 130 is configured to handle a predetermined number of requests from each of the masters, with the number of requests that can be accepted from each master being independent of the other(s); that is, the sizes of the SCIQ's are independent of one another. In addition, it is possible that an individual master may be capable of multiple requests independent of others from that master, so the request queue 290 (or 300) and corresponding SCIQ 250 (or 260) can in each case be split into multiple queues.

Any master can request transactions to any slave via the SC, for any selected number of master and slaves. The SC will typically be an ASIC configured for a given system with a predetermined maximum number of master and slave interfaces. Since it is a relatively simple and inexpensive ASIC (by comparison with the system as a whole), it provides great flexibility and economy by allowing designers to easily configure different SC's at low cost for different systems, each one tailored to the specific needs of that system.

The logic for the carrying out of the invention is provided by hardware/firmware logic of the SC ASIC and the master and slave interfaces, and by program instructions stored in memory 85 of the system, as shown in FIG. 1. Alternative embodiments may implement the logic in other fashions, e.g. by providing memories and general purpose processors to carry out any of the steps executed by the master interfaces, system controller and slave interfaces of the preferred embodiment of this invention.

Such logic (hardware or software) may generally be referred to as "logic modules" coupled to their respective processors, system controllers, slaves, or other system component indicating that such modules and their concomitant functions may be implemented as either hardware or software or some combination thereof. In the case of software which is executed on hardware logic (including processors), being "coupled to" a component means stored in registers and/or memory as necessary and executed in a conventional manner.

Operation of the System Controller

Figure 3A:
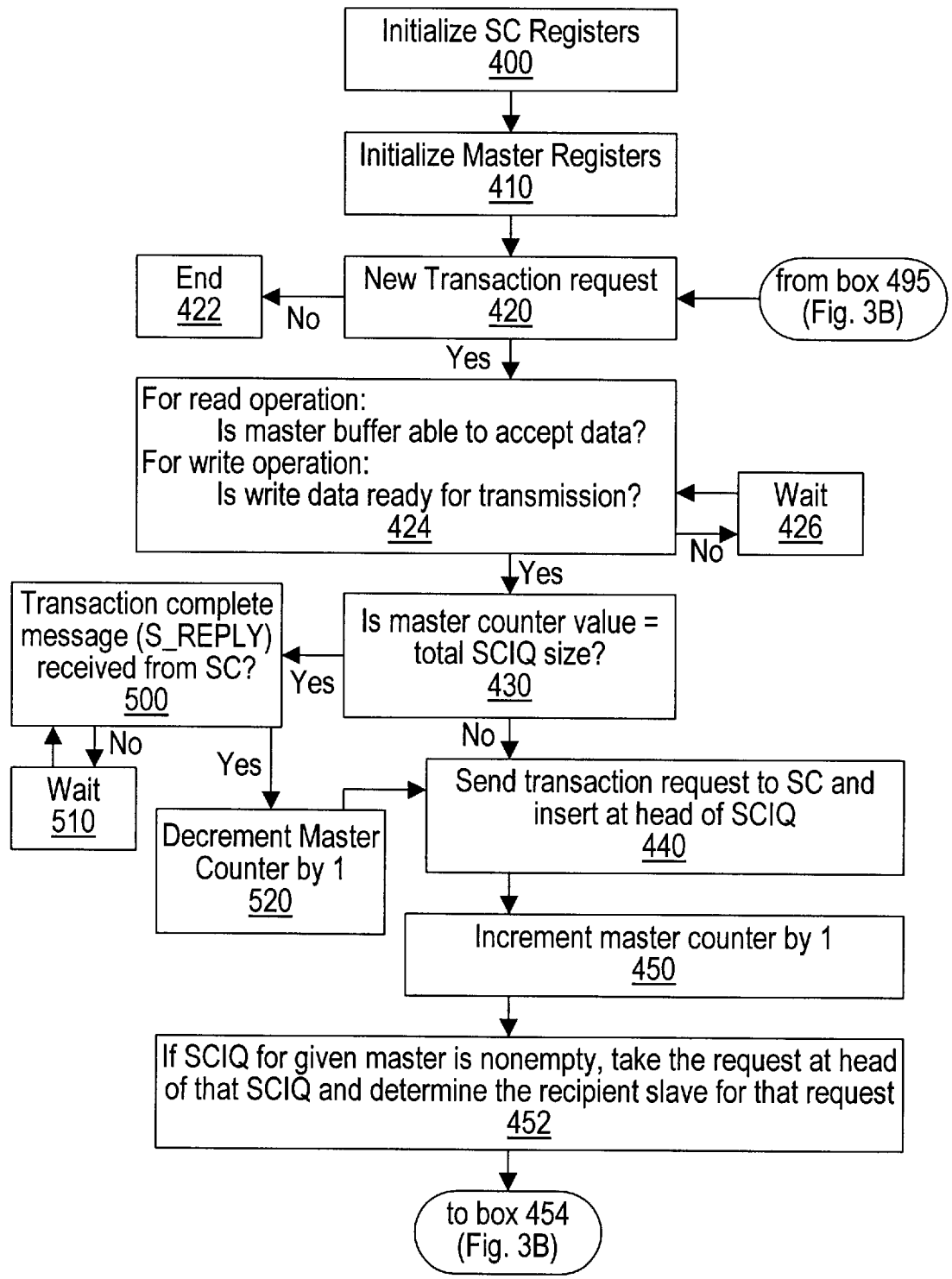
FIGS. 3A–3B together constitute a flow chart illustrating a generalized implementation of the method of the invention.
Figure 3B:
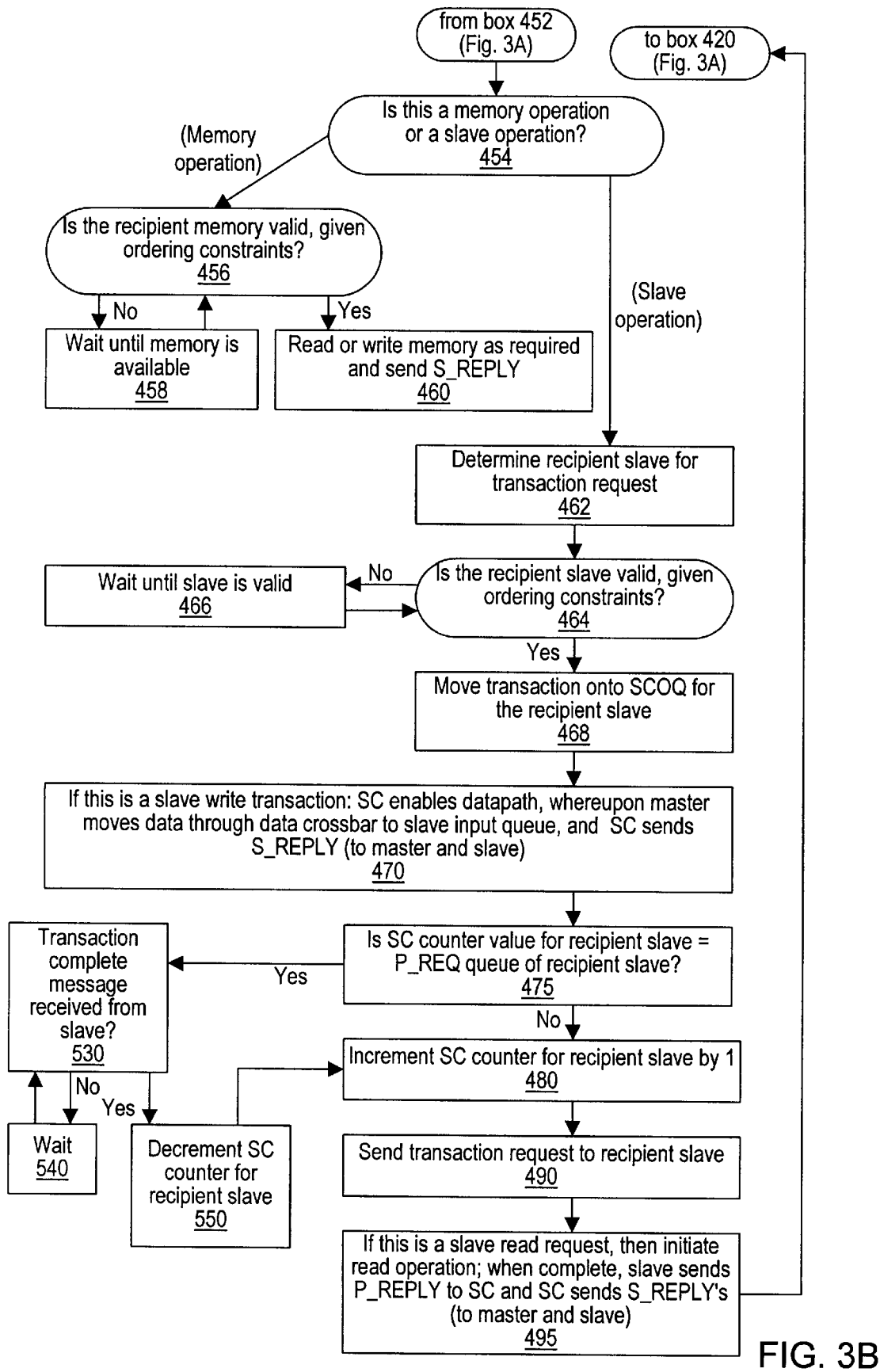

Referring now to FIGS. 3A–3B, at initialization (box/method step 400) all UPA port ID registers (e.g. the slave ID registers 180 and 190 in FIG. 2) are read, and their contents are written into the appropriate fields in the SC config register 200 (or into separate, dedicated config registers, as discussed above). The separate fields in a single SC config register embodiment is more likely to be used when the UPA (slave) ports are configured with a PROM instead of a port ID register. In the present application, whenever fields of the config register are referred to, it may be taken alternatively to mean separate config registers, and vice versa.

At box 410, the master registers are now initialized, which involves reading the SCID registers 255 and 265 and writing the SCIQ sizes (stored in those registers) in the respective config registers 270 and 280.

Since at start-up the config registers 200 fields and the config registers 270–280 must allow at least one transaction apiece (to read their corresponding ID registers 180–190 and 250–260, respectively), they are initialized to a value of "1" to begin with, to "bootstrap" the start-up. Then, when the read-ID-registers transaction requests are issued, and the counters are decremented, the requests will be allowed. (If the config registers were all at 0, no transactions would be allowed.) Upon the reading of the respective ID registers, the config register values are replaced with the correct values, i.e. the actual sizes of their associated ID registers.

At box 420, it is determined whether a new transaction request is pending in one of the masters, e.g. the master 120. If not, the procedure stops at box 422 (but may recommence at box 420 at any time that a new transaction request is made).

At box 424, if the pending transaction request is for a read operation, then the system determines whether the master read data buffer (discussed in greater detail below) for the master interface is ready to accept data, i.e. whether there is sufficient room in the master read data buffer to receive the data to be read. If not, then the system waits as at box 426 until the master read data buffer is ready. Note that a write operation need not be held up during a wait period for a read operation, but may proceed independently; and vice versa.

For a write operation, the system determines whether the data to be written to one of the slaves via a slave interface or memory is in fact ready for writing in (transmission to) a master write buffer. If not, again at box 426 a wait period is executed, until the data item is ready for writing.

When either the read or the write operation is ready for execution as far as the master interface is concerned, then at box 430 the system tests whether the value of the master counter (in this example, counter 320) or equal to the value stored in the config register, i.e. the size of the associated SCIQ 260 (as originally provided by the SCID register 265). (The master counter should never be able to exceed the value stored in the config registers, but in case it did this could be taken into account by using a "$\geq$" instead of "=" in the comparison test.) If the counter has not issued requests equal to the total SCIQ 260 size, then this test will be false and the method proceeds to box 440.

If the counter value has reached its maximum allowable value, then the transaction request will not be passed on to the SC, and the method proceeds to box 500. In this case, the transaction request pending in the master interface is required to wait (box 510) until a complete-transaction signal has been received from the SC before it can be issued. In a preferred embodiment, this complete-transaction signal takes the form of an S_REPLY signal, discussed in detail below with respect to FIGS. 4–7.

When this complete-transaction signal is received by the master interface 110 (box 500), the master interface decrements the counter associated with that SCIQ (box 530) and proceeds to the step at box 440.

At box 440, the counter 320 is incremented by one, and at box 450 the transaction request is sent by the master to the SC. Thus, the counter 320 now reflects the sending of one (or one additional) transaction request.

It will be appreciated that boxes 420–450 and 500–520 all relate to method steps that are carried out by or in the master or master interface, such as master interfaces 110 and 120. It will be seen below that boxes 452–458 and 462–490 (i.e. almost all of FIG. 3B) relate to method steps carried out in or by the system controller (SC). Boxes 460 and 495 relate to the method steps of reading and writing data as appropriate.

The SC is provided with intelligence and/or logic (hardware and/or software) to determine whether it has a transaction request pending in its request receive queue (such as SCIQ's 250 and 260). If so, then at box 452 the transaction request at the head of the queue is examined to determine which slave is intended as the recipient for the request. This queue control and recipient determination is carried out in a conventional manner.

At box 454 (FIG. 3A), the method determines whether the pending operation is a memory operation or a non-memory slave operation. If it is a memory operation, then at box 456 the method determines whether the recipient memory is valid, given global or other ordering constraints.

Some such possible constraints relate to delaying the processing of a memory or slave request by a given master until any requests to any other memory or slave, respectively, by that same master are resolved. That is, from a given master, e.g. master 1, a series of transaction requests to slave 1 may issue, and then a transaction request may be issued for slave 2. A preferred embodiment of the present system ensures that all of the pending slave 1 requests (from master 1) are completed before the new slave 2 request is executed. This ensures any slave 1 action upon which the new slave 2 transaction might rely will have taken place. Thus, strong global ordering of transaction requests from a given master with respect to requests issued to different slaves is maintained. This is accomplished by requiring the master to await a signal called S_REP from slave 1 before issuing the slave 2 request, discussed below.

In other systems, it may be preferable to allow master 1 to freely issue multiple request to slave 1 without awaiting an S_REPLY (transaction-complete) signal from slave 1. Even in such systems, there may be ordering or other constraints upon transactions that can temporarily disallow given memories or non-memory slaves from accepting certain transactions, either of predetermined transaction types or from particular masters, or both, or for some other reasons.

If for any of these reasons the recipient memory is not valid or available at this time, then at box 458 the method waits until the memory is valid and available.

If the recipient memory is valid, then at box 460 the data is read or written to/from memory as required, and the S_REPLY (transaction complete) signal is sent, as described in greater detail below.

If the pending transaction is a non-memory slave transaction, then at box 462 the method determines which slave is to receive the request. At box 464, it is determined whether the recipient slave is a valid recipient at this time, given the ordering or other constraints mentioned above. If not, at box 466 the method waits until the slave is valid.

Once the slave is valid for this transaction, then the transaction request is moved into the corresponding SC output queue (SCOQ) 210 or 220.

If the pending transaction is a slave write transaction, than at this time (box 470) the SC enables the datapath 155 via a datapath control signal, and the master (whose transaction is pending) is then able to move the data through the datapath to the appropriate slave input queue (185 or 195). The SC then sends its transaction-complete (S_REPLY) signal to both the master and the slave (see discussion below relative to FIG. 7).

At box 475, the SC 130 then checks the counter for the recipient slave, e.g. counter 240 if slave 150 is the destination for the pending transaction request. If the counter equals or exceeds the value in the config register (i.e. the size indicated by the ID register 180 or 190, which were read at initialization), then the request is not yet allowed. In this case, then steps 530–550 are followed (essentially identical to steps 500–520), until a free line opens up in the destination slave queue to receive the transaction request.

If the appropriate counter (230 or 240) has not reached its maximum allowed value, then it is incremented by one (box 480), and the transaction request is sent to the recipient slave (box 490).

If the pending transaction is a slave read request then at this point (box 495) the read operation is initiated. When it is complete, the slave sends a P_REPLY to the SC, and the SC sends S_REPLY's to both the requesting master and the recipient slave. See the discussion below relating to FIG. 6 below for details about the transaction and data flow for slave read requests.

At this point, the method then proceeds to box 420 in FIG. 3A, i.e. it is determined whether another transaction request is made.

The flow chart of FIGS. 3A–3B does not necessarily indicate a strictly linear sequence with respect to different transactions (though for a given transaction the flow is linear); e.g. in preferred embodiments a transaction request can be allowed to issue from one of the master interfaces even as another transaction request is issued by the SC to a slave interface. Other types and degrees of parallel operation may be implemented.

Flow Control

Figure 4:
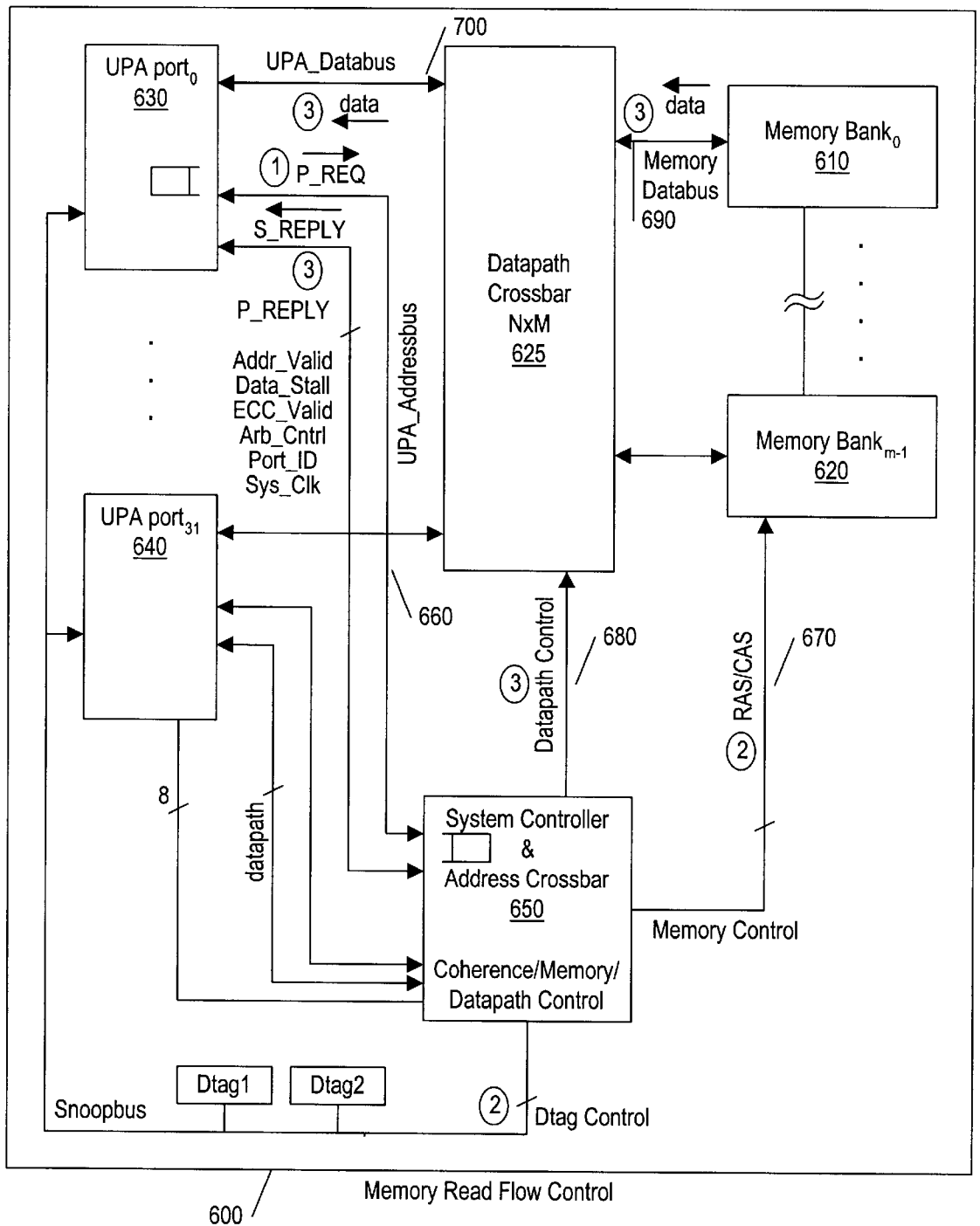
FIGS. 4–7 are block diagrams illustrating transaction flow control according to the invention for different types of transactions.
Figure 5:
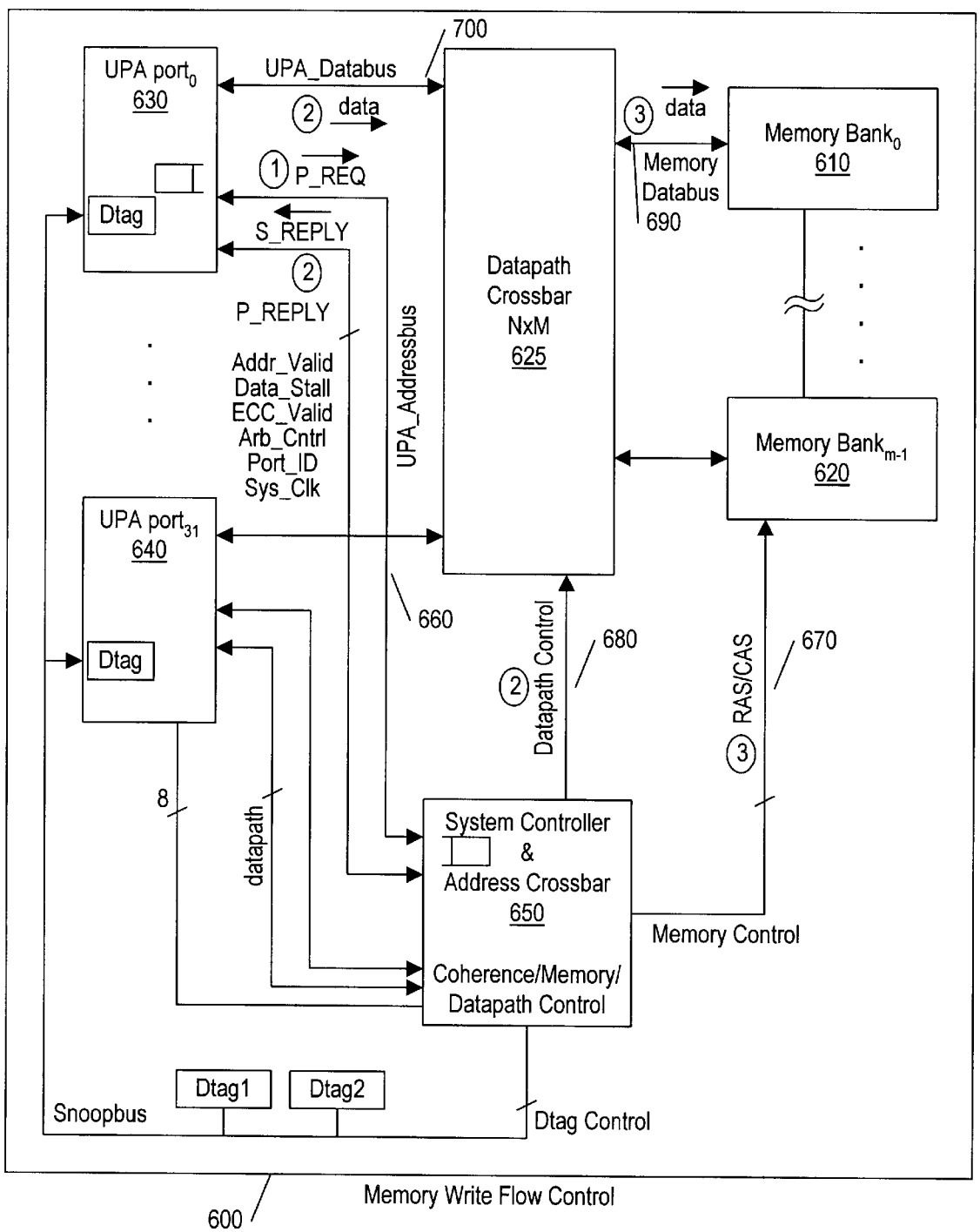
Figure 6:
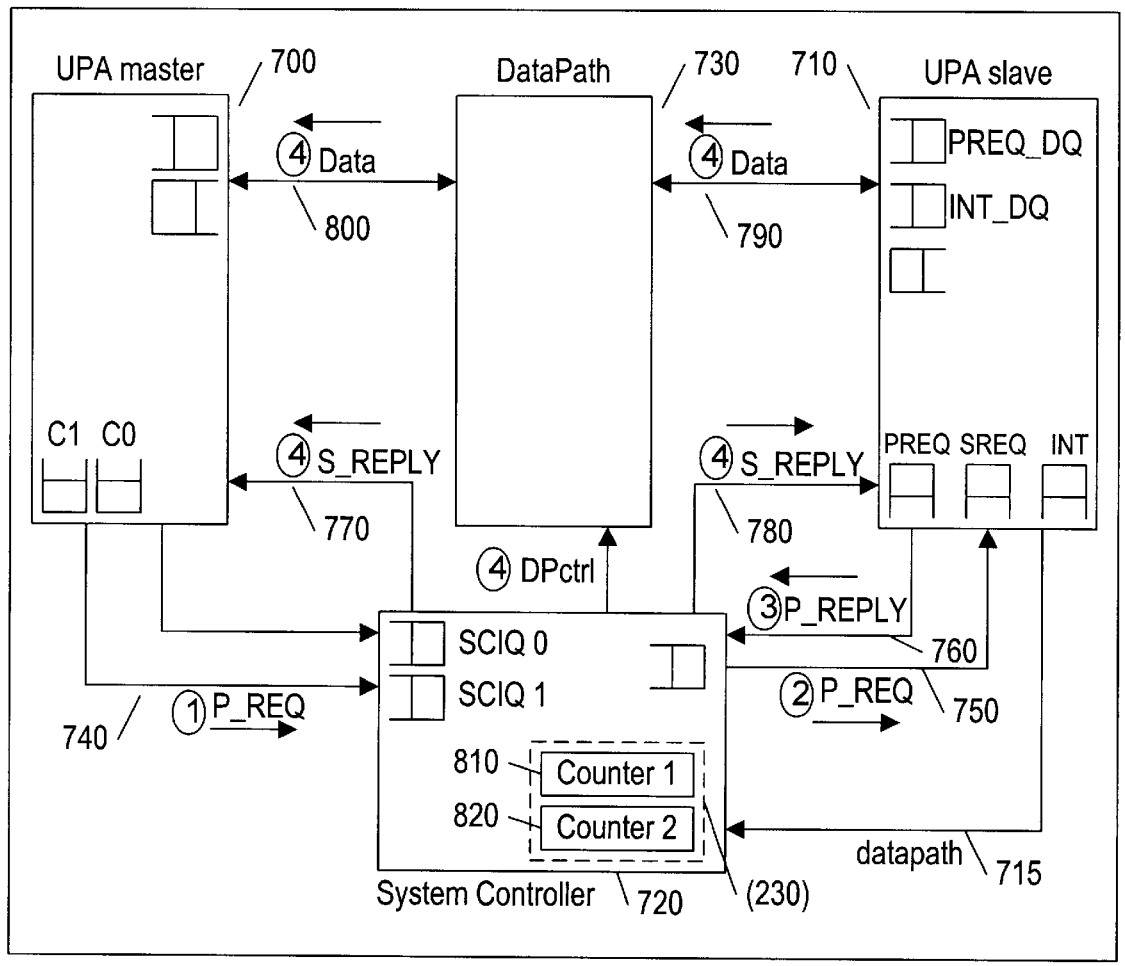

FIGS. 4–7 illustrate how flow control takes place in the present invention for each of four different types of transactions:

FIG. 4: read operation from memory (i.e. where the slave interface is a memory interface;

FIG. 5: write operation to memory;

FIG. 6: read operation from a device other than memory; and

FIG. 7: write operation from a device other than memory.

Other operations, such as cached read transactions (which involve the snoopbus, not a focus of the present invention) are possible, but these will suffice to illustrate the features of the present invention.

In FIGS. 4 and 5, for the sake of simplicity the queues and registers illustrated in FIG. 2 are not shown, but should be understood to be included in both the master interfaces (UPA ports) and system controller, in essentially the same configuration as in FIG. 2. Thus, the transaction control described above with respect to FIGS. 2 and 3 is accomplished also with respect to FIGS. 4–5, as well as 6–7.

However, the memory banks shown in FIGS. 4 and 5 need not include slave queues as shown in FIG. 2, nor does the system controller in FIG. 4 need to include a config register and counters as in FIG. 2; rather, conventional flow control as between a read- or write- transaction requesting device and memory may be utilized, and will be implementation-specific. Many standard designs that ensure that read and write requests are properly meted out to the memory banks will be appropriate. In this example, steps (boxes) 470–490 and 530–550 in FIGS. 3A–3B are replaced by equivalent steps for control of read and write transactions to and from the memories.

In FIG. 4, a specific embodiment of an interconnect module 600 is illustrated, where memory banks 610 . . . 620 are the slave devices, with a total of m memory banks being indicated by the subscripts (0) . . . (m−1). There are likewise multiple master interfaces (UPA ports) 630 . . . 640, in the present example 32 master interfaces being indicated by the subscripts 0 ... 31. A datapath crossbar 625 couples the memory banks to the UPA ports in a conventional manner.

As a rule, in this operation the order of reception of the transaction requests will be the order of reply by the slave interfaces.

In general in FIGS. 4–7, the order of events is indicated by the circled event numerals 1, 2, 3 and 4 (with accompanying arrows indicating the direction of data or signal flow), as the case may be for each figure. With the exception of the fact that the memories in FIGS. 4 and 5 do not include the slave queues and ID register of the slaves shown in FIG. 2, the following description of data flow with respect to FIGS. 4–7 should be understood to include the steps described with respect transaction request control (see FIGS. 3A–3B). Thus, for each request issued, the appropriate counter consultation, incrementation and decrementation is carried out to determine that the request is sent at an appropriate time. The respective queues are also handled as appropriate.

Memory Read Requests: FIG. 4

This read request example assumes that data is coming from memory, and not, e.g., from a cache. Snoop operations on the snoopbus shown in FIG. 4 are not in consideration here.

Event 1: When a UPA master port such as post 630 has a read-from-memory transaction ready, and the master counter is not at its allowed maximum (see box 430 in FIGS. 3A–3B), the read transaction is issued on the UPA_Addressbus from UPA port 630 to the system controller 650. This is indicate by the event 1 (P_REQ) along the UPA_Addressbus 660 in FIG. 4, with the direction of the information indicated by the arrow, i.e. from the port to the SC.

Event 2: The memory cycle [i.e. RAS (read-address-strobe)/CAS (column-address-strobe) request issuance] is issued over memory control bus 670 to the memory banks 610 . . . 620. See vent 2 ("RAS/CAS") along bus 670.

Event 3: The datapath is scheduled by a signal along the datapath control bus 680, and data items are accordingly delivered from memory to the datapath crossbar 625 via a memory databus 690 and UPA databus 700. This fulfills the read request.

Memory Write Requests: FIG. 5

FIG. 5 depicts the same circuit as FIG. 4, but the flow is different because it relates to a (non-cached) write operation instead of a read operation. Event 1 is the issuance of the write request along the UPA address bus 660.

In event 2, the datapath control signal over the bus 680 is sent to enable the datapath crossbar 625. Also, an S_REPLY is sent over bus 710 by the SC 650 to the UPA port 630 to source the data after the datapath is scheduled, and the data items are sent from the UPA port 630 to the datapath crossbar over data bus 700. Here, they are buffered, in preparation for forwarding to the memory banks. At this point, the counter in the UPA port is decremented to show that another transaction request is available to the system controller.

In event 3, the memory banks are enabled via bus 670 using RAS/CAS signals, and data items are sent via bus 690 to the memory banks. This completes the write operation.

The foregoing method ensures that no write request is issued until the write data are ready. E.g., if the databus 695 is 144 bits wide, but the bus 690 is 288 bits wide, the data words are buffered in the crossbar, assembled into 288-bit blocks, and then written to memory.

Slave Read Requests: FIG. 6

FIG. 6 illustrates a read sequence to a slave device other than memory, and is similar to FIG. 2, but for this example a single master interface 710 and a single slave interface 720 are used, coupled by a system controller 720 and a datapath crossbar 730.

Event 1 indicates the issuance of a read request P_REQ on UPA address bus 740 to SC 720.

In event 2, the SC 720 sends the P_REQ on address/control bus 750 to the slave interface 710. To do this, if there are several slave interfaces, the SC must first decode the address to ensure that the P_REQ goes to the correct slave interface. Event 2 informs the slave interface to prepare the data to move through the datapath.

When the data items are ready, then event 3 takes place, namely the sending of a P_REPLY from the slave 710 to the SC 720 over bus 760.

In event 4, a series of steps are executed to cause the master interface to receive the data: SC 720 schedules the datapath 730, and issues an S_REPLY over bus 770 to the master interface 700. In addition, the SC issues the S_REPLY over bus 780 to the slave 710, to drive the data, when it is ready, on the slave's UPA databus 790 via the datapath and over the databus 800 to the master interface 700.

Slave Write Requests: FIG. 7

FIG. 7 shows the identical apparatus as FIG. 6, but illustrates a write sequence from a non-memory slave interface to a master interface. This sequence ensures that data cannot be transferred until the data queue PREQ_DQ of the slave interface 710 has sufficient space.

In FIGS. 6 and 7, both a transaction request counter 810 and a data queue counter 820 are shown in the SC 720. These are counters to determine how full the PREQ queue and PREQ_DQ queue (slave output data queue) are, respectively. If these two queues are of different sizes, then their associated counters 810 and 820 are of different sizes. If these two queues are the same size, then a single counter may be used in the SC to monitor how full both queues are.

Event 1: The first event of the write operation is that a P_REQ is issued by the master interface 700 to the system controller 720 over bus 740.

Event 2: In event 2, the SC issues the P_REQ over address/control bus 750 to the slave interface 710. The P_REQ includes sufficient words to inform the SC how much data is being written. As mentioned above, the slave data queue counter 820 is used to track how full the data queue PREQ_DQ is. If the PREQ_DQ queue is too full, then the write transaction must wait.

The data queue PREQ_DQ may be the width of one word (e.g. 16 bits) or a block (e.g. 64 bits). Multiple transfer sizes are thus supported in the current system. Possible queue organizations include the maximum capacity per request, or some fraction of the maximum capacity per request, e.g. the 64-bit and 16-bit examples cited above. the queue PREQ_DQ is sufficiently available, then the write operation may proceed. Further in event 2, the SC schedules the datapath 730 with a datapath control signal "DP ctrl", and issues an S_REPLY to the master interface over bus 770 to drive the data on its data bus 800. In addition, the SC issues the S_REPLY over bus 780 to tell the slave interface 710 to receive the data over its data bus 790.

The transaction is complete as far as the master interface is concerned once it has received the S_REPLY and the data has been transferred over the bus 800 to the datapath crossbar 730. Thus, at this point, even though the slave interface may not yet have received the data, the master interface is prepared for an additional transaction.

Since the address and data paths are independent, the request packet (which includes the destination address) and the corresponding data may be forwarded in any order to the slave port. That is, the data might actually arrive at the input queue PREQ_DQ before the P_REQ arrives at the queue PREQ of the slave. If this happens, the data will have to wait until the P_REQ arrives, so that the slave can determine the destination address for the data. Alternatively, of course, the P_REQ may arrive first, and the data second, in which case it can immediately be written to the destination address specified by the P_REQ.

Event 3: Once the slave has cleared the requested data from its data queue and the transaction request from its input queue, it issues a P_REPLY over bus 760 to the SC, indicating that it is ready for another transaction. The SC decrements its counters 810 and 820 accordingly. The transaction is now complete from the SC's point of view; i.e. there are no more actions to be taken by the SC.

Transaction Ordering

The transactions herein are any type of request by a master device or module (hardware, software, or a combination). These include read-data transfers, write-data transfers, etc., which must be connected with the read and write replies. That is, for example, each write request is logically linked to write data (i.e. data to be written). While in the foregoing description the ordering of data transfer has been assumed to be governed by the order of write requests, other possibilities exist.

For instance, a link between a write request and the write data may be accomplished by assigning tokens to each write request and its corresponding data. The tokens would then be used to inform the system controller and processor of the completion of a given write request; that is, the write data carries its token along with it, and when it is received the write request having the associated token is known to be complete. Such a system requires token match logic to locate the associated tokens. The token system can be applied to the system controller operation described above for any transactions requested by a master, and frees up the ordering requirement of transaction request vis-a-vis completion of the requests; that is, read and write transactions may be carried out in an order other than the order in which they were issued.

In any case, for each transaction there will be a corresponding reply by the system controller, whether or not there is a data transfer. As a general matter, the order of events for various transactions will be:

Read from slave: read request>slave read reply>read data transfer (optional)

Write from master: write request>SC write reply>write data transfer (optional)

Write from slave: (write request/write data transfer, in either order)>slave reply when write data is consumed Thus, the present system is adaptable to many different ordering schemes, or indeed to schemes such as a token system where no particular ordering is required.

Figure 8:
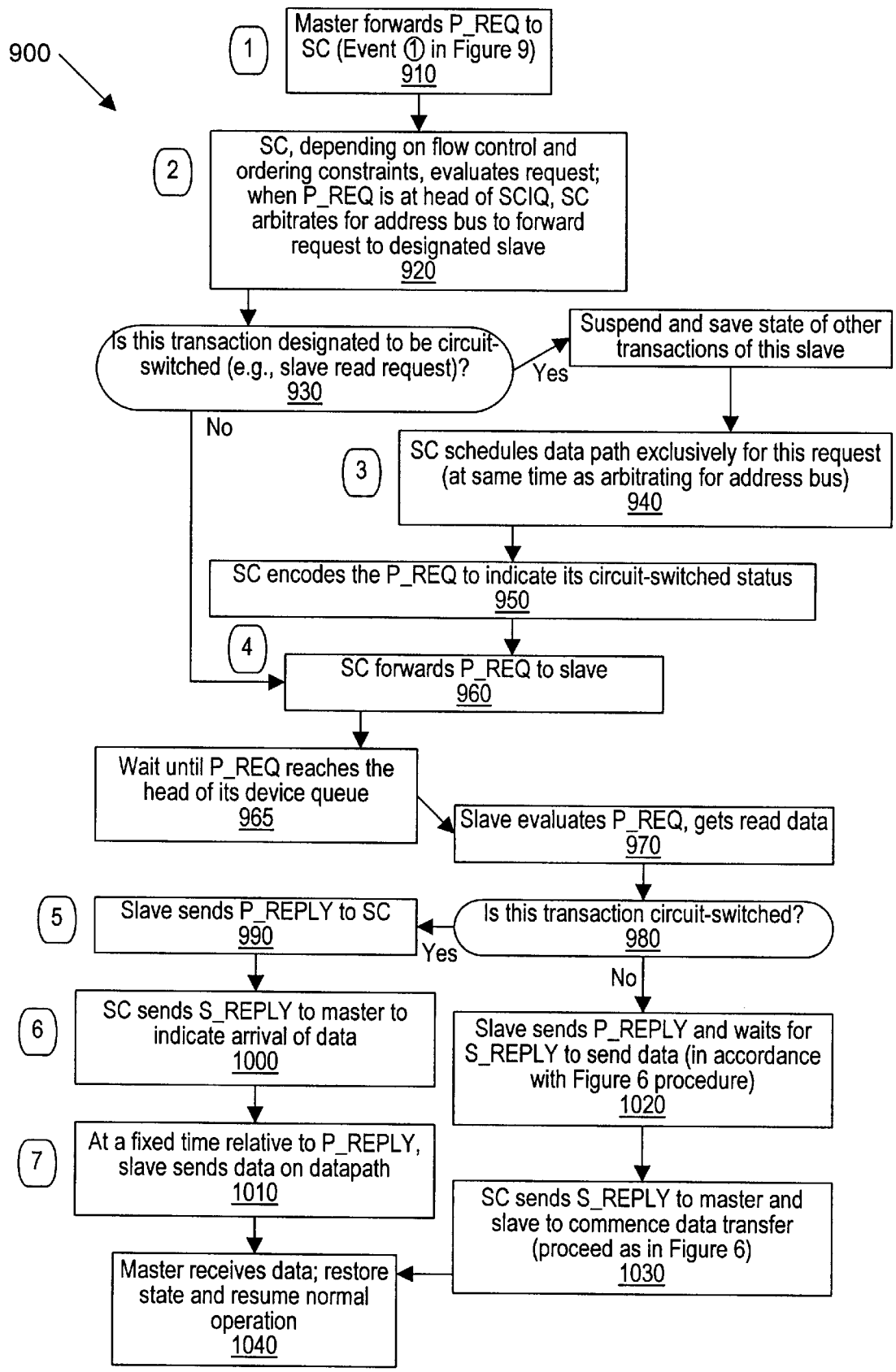
FIG. 8 is a flow chart illustrating the hybrid form of the invention, wherein both packet-switched and circuit-switched transactions are processed.

II. The Hybrid Circuit-Switched and Packet-Switched Embodiment of the Flow Control System FIG. 8 shows a hybrid method 900 using variations in the steps shown in FIGS. 3A and 3B. Method 900 allows the flow control system of the invention to treat some transactions as packet-switched and others as circuit-switched.

In the system as described in Section I above, the system controller will take a variable amount of time to respond to different transaction requests, from one to several clock cycles, depending on how full the queues are, how busy the slaves are, and so on. On a slave read request, there is an additional delay of perhaps two cycles to schedule the datapath, and a further delay of perhaps two clock cycles between the time the S_REPLY is sent from the SC to the master and the time that the data is actually provided to the master on the datapath. Thus, a slave read request may take on the order of ten clock cycles to complete, which can limit the overall bandwith for data flow in the system.

In a uniprocessor system, it helps to treat all slave read requests as circuit-switched transactions, i.e. immediately schedule the data transfers from the slave to the processor, without waiting for other transaction of that slave to be completed.

Figure 9:
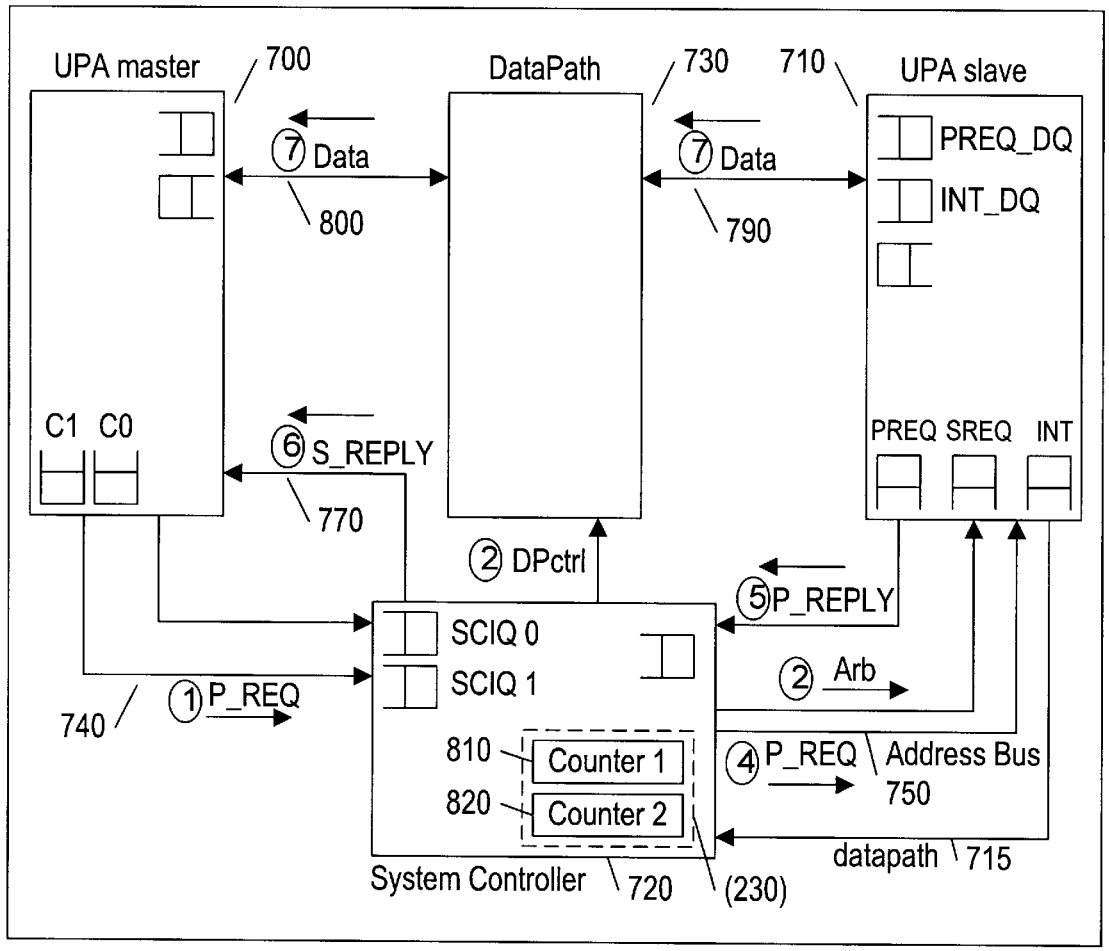
FIG. 9 is a block diagram illustrating transaction flow control in the hybrid circuit-switched and packet-switched embodiment of the invention.

FIG. 8 should be read in light of FIGS. 3A–3B, which give the detailed transaction flow in the non-hybrid system. Transaction flow in the hybrid system is carried out in the same fashion, with the variations described below. At box 910, a master issues a P_REQ to its SC, in the manner described in Section I. At box 920, the SC takes into account flow control and ordering restraints in the same manner, and when the P_REQ reaches the head of its SCIQ, the SC arbitrates for the address bus, to forward the requests to the designated slave. In FIG. 9, which illustrates the flow control of the method of FIG. 8, step 910 corresponds to event 1 (along bus 740), and step 920 corresponds to event 2 ("Arb").

At box 930, the SC determines whether this transaction should be designated as a circuit-switched transaction. This can happen in a variety of ways. In a uniprocessor system, preferably all slave read requests (or some other predesignated subset of transaction requests) will automatically be designated as circuit-switched.

In a multiprocessor system or a system with certain master devices that are reliably faster than others, the fast devices can be predesignated as "circuit-switched" masters, so that all slave read requests (or other desired transactions) from those particular devices are designated as circuit-switched.

A uniprocessor system to which one or more processors are added can automatically reconfigure itself from the uniprocessor embodiment (where all slave read requests are circuit-switched) to the multiprocessor embodiment (where additional criteria may come into play) by detecting the presence of the additional processor(s) and providing this information to the SC. This provides an adaptive, self-reconfiguring mechanism, operating in a uniprocessor mode whenever only one processor (or, more generally, one master) is present and in multiprocessor mode whenever more than one processor (or master) is present in the computer system.

Thus, when a second processor is plugged into a uniprocessor system, the system controller and control software automatically make decisions as to circuit-switched or packet-switched statuses of requests based upon different criteria than when the system had only one processor. The user who plugs in the microprocessor need take no other steps to make this happen; adding the processor automatically causes the system to convert to the multiprocessor mode, and removing it (or making a determination that only one processor is available or functional) returns the system to the uniprocessor mode.

Alternatively or in addition to the foregoing, all slave read requests to particular predetermined slaves (ideally, fast slaves such as a fast 64-bit PCI device) can be designated to be circuit-switched. Dynamic decision-making capability can optionally (instead or additionally) be provided by predesignating a range of device addresses, storing these addresses and initializing control registers in the decision-making module (e.g.,the SC) at system initialization, so that all slave read requests to any devices having addresses within the predesignated range shall be treated as circuit-switched transactions. This range may include only one address, multiple contiguous addresses, or noncontiguous addresses, as desired, and may be dynamically redefined by software.

The subset of transaction requests to be treated as circuit-switched transactions is itself variable, and may be reconfigured in advance or dynamically in software (by, e.g., tags); that is, this subset may include only slave read requests, as in the preferred embodiment, or may instead or additionally include other types of transaction requests, either those discussed herein or others that may be provided for by the system controller.

Other variables may be considered in determining whether to designate transaction requests as circuit-switched. Since the SC has its own logic 245 (see FIG. 2), including possibly a processor or other appropriate circuitry and/or software as required for the desired implementation, the criteria available for providing to the SC to make this determination are quite broad, since they may include either software values or hardware signals; they may include essentially any variable relating to the system, including state information of the system or any device or process in it. This will preferably include the current status of any pending transaction, including information relating to the states of the master, SC and slave queues; the point in the procedures illustrated in FIGS. 3A–3B and 9 which each pending transaction request has reached; and, generally, the information necessary to restore each variable, queue, etc. to its state immediately prior to the effective interruption worked by the incoming circuit-switched request. Mechanisms and principles for storing and restoring system states in responding to conventional interrupts may, for instance, be applied to the task of storing and restoring states of the system of the invention in responding to circuit-switched transaction requests, and can included dedicated hardware and/or program modules as desired.

In the hybrid system of the invention, "circuit-switched" effectively means that the SC can immediately schedule the datapath for the transfer of data from a slave to a master, upon meeting certain criteria such as receiving a slave read request. Thus, if it is determined at box 930 that the present transaction is to be treated as circuit-switched, then the method proceeds to box 935, where other transactions are suspended or interrupted and their states are saved. The method then proceeds to box 940, where the SC schedules the data path for this request, which takes place effectively or actually at the same time as arbitration for the address bus (as in box 920). This corresponds to event 3 in FIG. 9.

At box 950, the SC encodes the current request to indicate its circuit-switched status. This status will be detected by the slave upon forwarding of the request thereto, which occurs at box 960, corresponding to event 4 in FIG. 9. Note that, if the current request is a usual packet-switched request, then the method proceeded from box 930 directly to box 960 (in which case the entire procedure will not differ essentially from that shown in FIGS. 3A–3B; the packet-switched path is shown here to illustrate the interaction between FIGS. 3A–3B and FIG. 9).

At box 965, a wait is executed by the slave relative to this P_REQ, until it reaches the top of the slave queue. Then, at box 970, the slave evaluates the P_REQ, including determining whether it is to be circuit-switched (for which a field or tag may be supplied in the P_REQ), and obtains the read data.

At box 980, it is determined by the slave whether the current transaction request is a circuit-switched type. If not, then the method proceeds to box 1020, where the slave sends its P_REPLY and waits for an S_REPLY to send its data, in accordance with the procedure described above with respect to FIG. 6. Then, at box 1030, the SC sends its S_REPLY to the master and the slave to commence the transfer of data, the master receives the data at box 1040, and the normal operation continues as described in Section I.

If the determination at box 980 is affirmative, then at box 990 the slave sends its P_REPLY to the SC, as indicated by event 5 in FIG. 9. Then, at box 1000, the SC sends its S_REPLY to the master to indicate the impending arrival of data from the slave, corresponding to event 6 in FIG. 9.

At box 1010, the slave sends its data onto the datapath. This corresponds to event 7 in FIG. 9, and should take place at some predetermined time later than the sending of the P_REPLY to the SC at box 990. This predetermined time may be calculated based upon preselected variables provided to the slave, but is preferably a fixed time (such as 1 or 2 cycles) later than the P_REPLY. If it is a variable or calculated time, then the time is preferably communicated to the master with the SC's S_REPLY.

In either case, the master knows when to expect the data on the datapath, and accordingly at box 1040 the master receives the data, and normal operation is resumed. This includes the restoration of all states to their condition just prior to the switching to the circuit-switched mode. The details of which state data to save and restore will be implementation-specific.

The principles of incrementing and decrementing the counters, placing requests in the various queues and issuing them when the devices become available, and so on, can be implemented in the hybrid system just as they were in the embodiment of the pure packet-switched system described in Section I above, or in some other suitable manner; the particulars are not crucial. The hybrid system's most important functions include taking predesignated transaction requests (such as slave read requests for certain masters or in certain predefined configurations) out of order, with respect to other transaction requests, and processing them by scheduling the datapath for immediate delivery of the requested data, to improve the overall performance of the system.

The circuitry and software used to implement the hybrid circuit-switched/packet-switched system may take on a variety of configurations. As discussed above, they may be implemented as, for instance, software executed on an ASIC or processor (generally, SC logic 245 in FIG. 2), and they will in the preferred embodiment include program modules executed by the master, the SC and the slave in conjunction with one another. As decisions are made and actions taken at each of the events 1–7 in FIG. 9 and steps of FIG. 8, it is most efficient to provide the decision-making capability at the device taking the action.

Thus, the SC may include program instructions (a program module) to tag the P_REQ to identify it as circuit-switched, as in box 950 of FIG. 8. In addition, the SC should determine in box 930 of FIG. 8 whether the current P_REQ is in fact of a predetermined type that should be circuit-switched, or of another type that should be packet-switched. However, it is equally possible for the master issuing the request to tag it as circuit-switched, thus removing that decision from the SC; in this case, the SC will respond to the tag instead of making its own determination. An advantage of this embodiment is that a new device could be plugged into an existing system, about which the SC has no information and no decision-making capability (e.g., as to whether to circuit-switch transaction requests from that device or that type of device)—in which case, if the SC is provided in advance with instructions to check for a "circuit-switch" tag and treat requests with such a tag accordingly, then the SC need not be modified (either in hardware or software) as types of devices are added to the system.

Even more flexible is an embodiment where the SC has certain predetermined criteria which are modifiable in its software modules, and further includes a general decision-making capability (either in hardware or software) to inspect incoming transaction requests for a circuit-switch tag or field.

The system controller of the invention may more broadly be defined as a transaction request controller, i.e. any hardware or software subsystem included by or coupled to a master and/or a slave, that makes the determinations and executes the operations necessary to treat some transaction requests as circuit-switched, and others as packet-switched. Such a transaction request controller need not include all of the details presented for the preferred embodiment of the system controller in Section I above, though that preferred embodiment does provide a convenient and efficient architecture for implementing the invention.

Another variation on the invention is that a subsystem of a multiprocessor system may locally, and under certain circumstances, act as a uniprocessor system for the purposes of the invention. Thus, a given processor may treat slave read requests to its own local slave devices (those on its local address bus) as priority circuit-switched events, while treating requests from other processors as packet-switched. This particular implementation uses an identification of the source of the transaction request as one criterion for determining in which mode to execute the transaction.

Thus, given the functions described above and the corresponding flow charts and diagrams, it will be seen that there is a broad range of architectures and implementations available that can be used to realize the features of the invention, including, if desired, placing decision-making capabilities on devices other than those taking the immediate action or on more than one component of the system.

What is claimed is:

1. A control system for providing circuit-switched and packet-switched transaction flow in a computer system having at least one microprocessor with at least one master device, a main memory and at least one slave device, the control system comprising:

a system component coupled to said master device and configured to determine whether a transaction request issued by said master device is of a first predetermined type of transaction request or a second predetermined type of transaction request;

a first logic module cooperating with said system component to initiate execution of said transaction request as a packet-switched transaction if the request is of said first predetermined type and executes said transaction request as a circuit-switched transaction if the request is of said second predetermined type.

2. The control system of claim 1, wherein said system component comprises:

a system controller coupled between the master device and the slave device, including a second logic module for making said distinction between said first and second predetermined types.

3. The control system of claim 1, wherein said first logic module includes:

a processor;
   a memory coupled to said processor; and
   program instructions stored in said memory and executable on said processor, said instructions including predetermined test criteria indicating to said system component whether said transaction request is of said first type or of said second type.

4. The control system of claim 1, wherein said master device includes a second logic module configured to generate an identifier of said first transaction request as being one of said first type and said second type, and to transmit said identifier to said first logic module.

5. The control system of claim 4, wherein said identifier comprises a tag appended to said first transaction request and transmitted therewith from said master device to said system component.

6. The control system of claim 1, further including a second logic module configured to grant priority to said first transaction request if it is determined to be of said first type.

7. The control system of claim 6, further including a third logic module, coupled to at least one of said master and said system component, and configured to save a state of said computer system at the time of said granting of priority, and to restore said state after processing of said first transaction request.

8. The control system of claim 1, wherein:

said computer system includes a datapath between said master device and said slave device; and
   said control system further includes a second logic module including instructions to said system component to schedule said datapath in priority over other pending transaction requests if said first transaction is determined to be of said first type.

9. The control system of claim 1, wherein said system component includes a second logic module including at least one predetermined criterion and configured to provide said system component with a basis for making said determination of the transaction type of said first transaction request.

10. The control system of claim 9, wherein said at least one predetermined criterion includes an identification of at least one said predesignated slave device and an indication to said system component that at least a predetermined subset of transaction requests to said predesignated slave device shall be identified as being of said second type.

11. The control system of claim 10, wherein said predetermined subset includes all read transaction requests to said predesignated slave device.

12. The control system of claim 9, wherein said at least one predetermined criterion includes a device address range to indicate to said system component that at least a predetermined subset of transaction requests to devices having addresses within said address range shall be identified as being of said second type.

13. The control system of claim 9, wherein said second logic module includes instructions to said system component to execute said first transaction request according to a first mode of operation if said computer system is a uniprocessor system and according to a second mode of operation if said computer system is a multiprocessor system.

14. The control system of claim 13, wherein said at least first mode of operation includes a designation of all slave read requests as being of said second transaction type.

15. A computer system, comprising:

at least one processor;
   a memory coupled to said processor and including program instructions executable on said processor;
   at least one slave device configured to receive transaction requests from said processor and to execute said transaction requests;
   a transaction request controller coupled to said processor and to said slave device, including a logic module configured to execute a transaction request issued by said processor in a first mode if it is of a first type and execute said received transaction request in a second mode if it is of a second type.

16. The computer system of claim 15, wherein said first mode is a packet-switched mode and said second mode is a circuit-switched mode.

17. A method for executing transactions in response to transaction requests from a master device to a slave device in a computer system including at least one processor and a memory coupled to said processor and storing instructions controlling execution of said transactions, comprising:

(1) determining, based upon at least one predetermined criteria, for at least one transaction request issued by said master to a first said slave whether said issued transaction request is of a first predesignated type or of a second predesignated type;

(2) executing the requested transaction in a first mode of operation if the transaction request is of said first type; and (3) executing the requested transaction in a second mode of operation if the transaction request is of said second type.

18. The method of claim 17, wherein said first mode of operation is a packet-switched mode and said second mode is a circuit-switched mode.

19. The method of claim 17, wherein said criterion is based at least in part upon whether said first slave is one of a predetermined category of slave devices.

20. The method of claim 17, wherein said criterion is based at least in part upon whether said first slave device has an address within a predefined range of addresses.

21. The method of claim 17, wherein said criterion is based at least in part upon a determination of the number of processors included in said computer system.

22. The method of claim 17, wherein said criterion is based at least in part upon an identification of said master device.

23. A control system for providing circuit-switched and packet-switched transaction flow in a computer system having at least one microprocessor with at least one master device, a main memory and at least one slave device, the control system comprising:

a data crossbar coupled between said master device and said slave device and configured to provide a data path between said master device and said slave device; and a system controller coupled to said master device, said slave device and said data crossbar and configured to determine a source or destination of a transaction request and initiate execution of said transaction request as a packet-switched transaction or a circuit-switched transaction in dependence upon said source or destination.

* * * * *